(12) United States Patent
Dourlens et al.

(10) Patent No.: US 7,018,104 B2
(45) Date of Patent: *Mar. 28, 2006

(54) BEARING ASSEMBLY AND METHOD

(75) Inventors: Herve H. Dourlens, Manne-villette (FR); Dale F. Marshall, Le Havre (FR); Philippe Auber, Le Havre (FR)

(73) Assignee: Dresser-Rand Company, Olean, NY (US)

( * ) Notice: Subject to any disclaimer, the term of this patent is extended or adjusted under 35 U.S.C. 154(b) by 81 days.

This patent is subject to a terminal disclaimer.

(21) Appl. No.: 10/772,718

(22) Filed: Feb. 5, 2004

(65) Prior Publication Data

US 2004/0161180 A1    Aug. 19, 2004

Related U.S. Application Data

(63) Continuation of application No. 10/137,767, filed on May 2, 2002, which is a continuation-in-part of application No. 09/970,319, filed on Oct. 3, 2001, now Pat. No. 6,637,942.

(51) Int. Cl.
*F16C 17/03*    (2006.01)

(52) U.S. Cl. .................................... 384/309

(58) Field of Classification Search .............. 384/117, 384/107, 215, 306–308, 309, 312
See application file for complete search history.

(56) References Cited

U.S. PATENT DOCUMENTS

| | | | |
|---|---|---|---|
| 3,473,853 A | 10/1969 | Goss et al. | |
| 4,027,931 A | 6/1977 | Streifert | |
| 4,088,211 A | 5/1978 | Doller et al. | |
| 4,097,094 A | 6/1978 | Gardner | |
| 4,134,309 A | 1/1979 | Balke et al. | |
| RE30,210 E | 2/1980 | Buono et al. | |
| 4,276,974 A | 7/1981 | Ladin | |
| 4,337,982 A | 7/1982 | Moringiello et al. | |
| 4,440,456 A | 4/1984 | Klusman | |
| 4,457,667 A | 7/1984 | Seibert et al. | |
| 4,496,252 A | 1/1985 | Horler et al. | |
| 4,517,505 A | 5/1985 | Cunningham | |
| 4,783,179 A | 11/1988 | Katayama et al. | |
| 4,786,536 A | 11/1988 | Kaempen | |
| 4,814,603 A | 3/1989 | Philips | |
| 4,872,767 A | 10/1989 | Knapp | |
| 4,971,457 A | 11/1990 | Carlson | |

(Continued)

FOREIGN PATENT DOCUMENTS

DE         620 365 C        10/1935

(Continued)

OTHER PUBLICATIONS

European Patent Office "Communication—European Search Report," European Patent Application No. EP 03 00 9732, Sep. 9, 2003, 6 pages.

(Continued)

*Primary Examiner*—Lenard A. Footland
(74) *Attorney, Agent, or Firm*—Michael Best & Friedrich LLP

(57) ABSTRACT

A bearing assembly and method in which a bearing cage is disposed around a rotating member and a housing is disposed around the cage. A first portion of the radial outer surface of the cage extends in a slightly spaced relation to the corresponding portion of the inner surface of the housing, and a second portion of the radial outer surface of the cage projects from the first portion in a radial direction and engages the corresponding portion of the inner surface of the housing.

15 Claims, 3 Drawing Sheets

U.S. PATENT DOCUMENTS

| | | |
|---|---|---|
| 4,971,458 A | 11/1990 | Carlson |
| 5,080,555 A | 1/1992 | Kempinger |
| 5,127,478 A | 7/1992 | Miller |
| 5,201,587 A | 4/1993 | Springer |
| 5,215,384 A | 6/1993 | Maier |
| 5,215,385 A | 6/1993 | Ide |
| 5,356,226 A | 10/1994 | Onishi et al. |
| 5,421,655 A | 6/1995 | Ide et al. |
| 5,425,584 A | 6/1995 | Ide |
| 5,427,455 A | 6/1995 | Bosley |
| 5,494,448 A | 2/1996 | Johnson et al. |
| 5,651,616 A | 7/1997 | Hustak et al. |
| 5,738,445 A | 4/1998 | Gardner |
| 6,637,942 B1 | 10/2003 | Dourlens et al. |

FOREIGN PATENT DOCUMENTS

| | | |
|---|---|---|
| DE | 28 47 979 A | 5/1980 |
| EP | 1 300 600 | 4/2003 |
| FR | 1072836 | 9/1954 |
| GB | 205655 | 10/1923 |

OTHER PUBLICATIONS

Copy of Communication from the European Patent Office with European Search Report dated Mar. 9, 2005 for European Patent Application No. 05000410.0 (5 Pages).

Copy of cover and redacted first page of Communication Pursuant to Article 96(2) EPC from the European Patent Office dated Mar. 15, 2005 for European Patent Application No. 03009732.3 (2 Pages).

BEARING ASSEMBLY AND METHOD

CROSS-REFERENCE TO RELATED APPLICATION

This application is a continuation of application Ser. No. 10/137,767 filed May 2, 2002, which is a continuation-in-part of U.S. Ser. No. 09/970,319 filed Oct. 3, 2001, now U.S. Pat. No. 6,637,942 issued Oct. 28, 2003.

BACKGROUND

This invention relates to a bearing assembly and method for a rotating member, and, more particularly, to a bearing assembly and method involving a bearing cage that extends between the rotating member and a bearing housing.

In many bearing designs of the above type, it is necessary to have a fairly precise engagement between the bearing cage and the bearing housing that will be sufficient through the range of manufacturing clearances of these components, yet will maintain a positive seal at the joint between the housing and cage. Also, it is important that the bearing geometry be controlled and that the clamping force not be high enough to cause bending or deformity.

DETAILED DESCRIPTION

Figure 1:
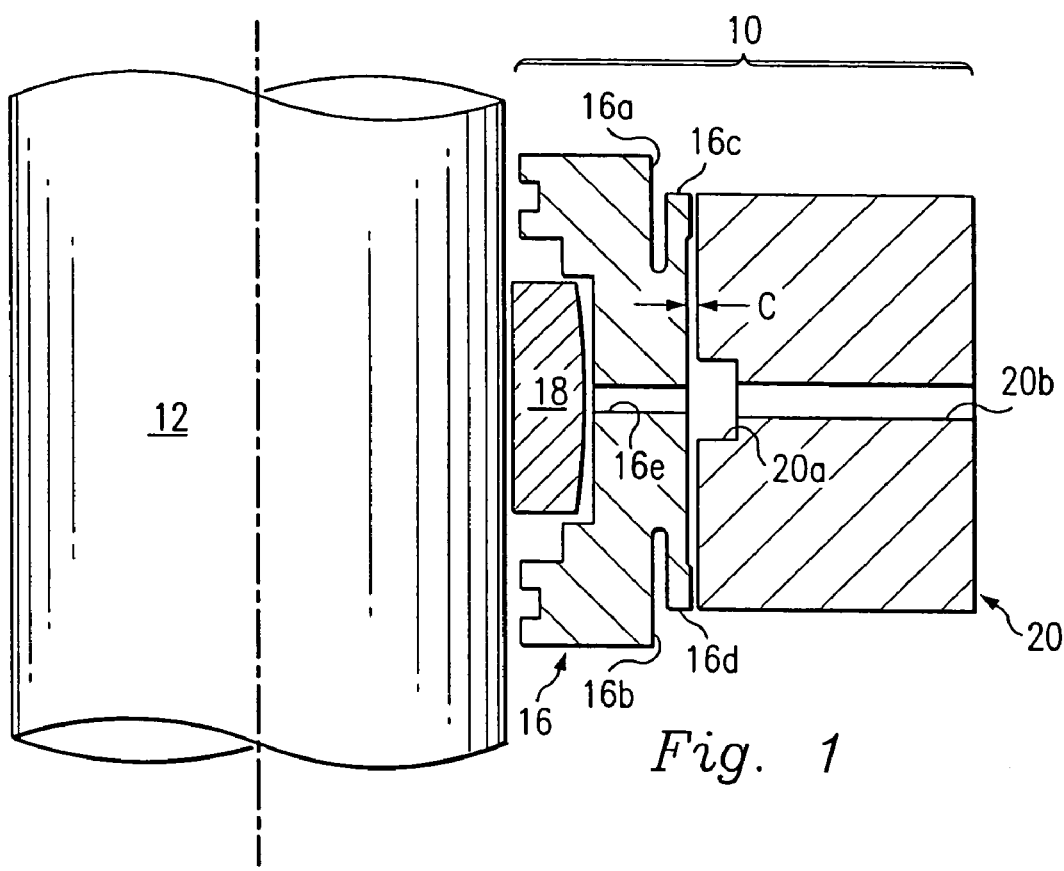
FIG. 1 is a cross-sectional view of the bearing assembly according to an embodiment of the present invention, shown in operative engagement with a rotor, which is shown in elevation.

Referring to FIG. 1 of the drawings, the reference numeral 10 refers in general to the bearing assembly according to an embodiment of the invention which surrounds a rotor 12. It is understood that the rotor 12 is rotated about its axis and forms part of an assembly that includes a driving system for imparting torque to the rotor, in a conventional manner.

An annular bearing cage 16 extends around the rotor 12 and has an internal recess formed therein for receiving a series of tilt pads 18, one of which is shown, which form the bearing members. Since the tilt pads 18 are conventional, they will not be described in detail.

Two axially-extending grooves 16a and 16b are formed in the outer periphery of the cage 16 with each extending for approximately 180 degrees. The grooves 16a and 16b are spaced radially inwardly from the outer radial surface of the cage 16 a predetermined amount to form cantilevered portions 16c and 16d that extend radially outwardly from the respective grooves. The thickness of each cantilevered portion 16c and 16d is such that it functions as a mechanical spring. It is understood that the thickness of each portion 16c and 16d, and therefore the stiffness of the mechanical spring formed by each portion, can be adjusted relative to the bearing stiffness of the tilt pads 18.

A radially-extending passage 16e is formed through the center of the cage 16 for supplying lubricating oil to the tilt pad 18, in a manner to be explained.

An annular housing 20 surrounds the cage 16 and has an internal annular recess 20a which communicates with the passage 16e of the cage 16 and with a radially-extending through passage 20b. Oil can thus be introduced to the passage 20b and passes through the latter passage, the recess 20a and the passage 16e for supplying oil to the tilt pads 18.

A majority of the radial inner surface of the housing 20 is slightly spaced from the radial outer surface of the cage 16, including the cantilevered portions 16c and 16d, to form an annular clearance C which communicates with the recess 20a of the housing 20 and thus receives some of the above-mentioned oil.

Figure 2:
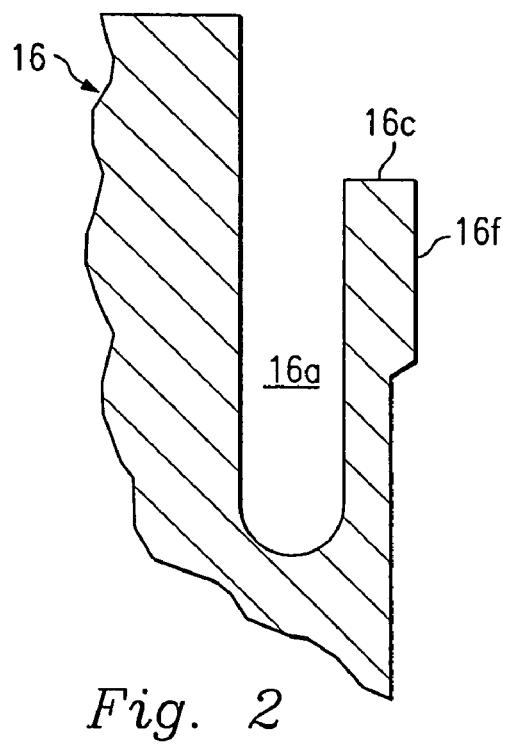
FIG. 2 is an enlarged cross-sectional view of a portion of the bearing assembly of FIG. 1.

As better shown in FIG. 2, the axial end portion of the radial outer surface of each cantilevered portions 16c and 16d is enlarged as shown by the reference numeral 16f in connection with the cage portion 16c. The enlarged portions, including the portion 16f, project radially outwardly from the plane of the latter portions. Although the enlarged portion 16f is shown slightly spaced from the corresponding inner surfaces of the housing 20 in FIG. 1 in the interest of clarity, the enlarged portions actually engage the latter surfaces in an interference fit to prevent the leakage of oil from the clearance C. Also, the axial lengths of the enlarged portions, including the portion 16f are designed to minimize contact stresses between the cage 16 and the housing 20.

The system 10 thus has the following advantages:

1. A relatively low clamping force acts on the bearing housing 20 to eliminate the risk of deformation and leakage.
2. No deformation of the inside of the cage 16 occurs where the tilt pads 18 contact the cage, allowing a much better control of the tilt pad bearing geometry.
3. There is less sensitivity to temperature effects on the housing 20 resulting in minimum deleterious effects on the interference fit between the enlarged portions, including portion 16f, of the cantilevered portions 16c and 16d and the corresponding surfaces of the housing 20.
4. The presence of the oil in the clearance C provides additional damping of the bearing assembly 10 in general, thus significantly increasing the damping provided to the rotor 12.

Figure 3:
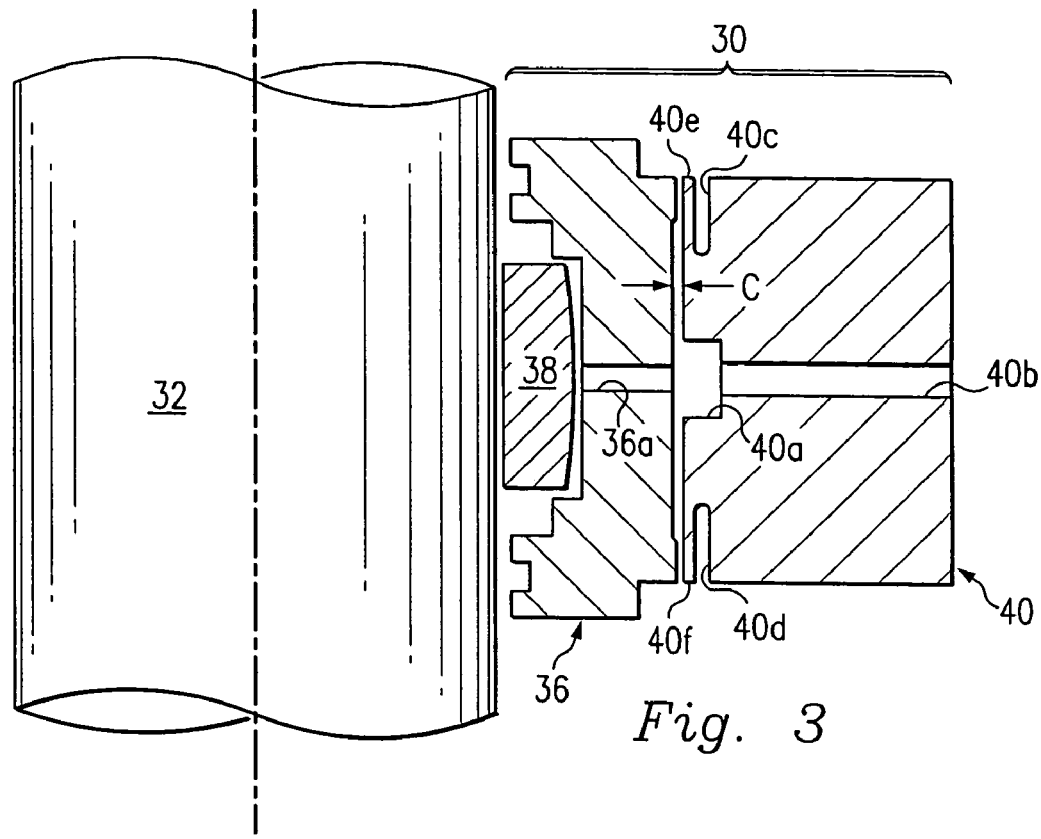
FIGS. 3 and 4 are views, similar to FIGS. 1 and 2, respectively, but depicting an alternate embodiment of the present invention.

Referring to FIG. 3, the reference numeral 30 refers, in general, to the bearing assembly according to another embodiment of the invention. The bearing assembly 30 surrounds a rotor 32 which is rotated about its axis and forms part of an assembly that includes a driving system for imparting torque to the rotor, in a conventional manner.

An annular bearing cage 36 extends around the rotor 32 and has an internal recess formed therein for receiving a series of tilt pads 38, one of which is shown, which form the bearing members. Since the tilt pads 38 are conventional they will not be described in detail. A radially-extending passage 36a is formed through the center of the cage 36 for supplying lubricating oil to the tilt pad 38, in a manner to be explained.

An annular housing 40 surrounds the cage 36 and has an internal annular recess 40a which communicates with the passage 36a of the cage 36 and with a radially-extending through passage 40b. Oil can thus be introduced to the passage 40b and passes through the latter passage, the recess 40a and the passage 36a for supplying oil to the tilt pads 38.

Two axially-extending grooves 40c and 40d are formed in the outer periphery of the housing 40 and each extends for approximately 180 degrees. The grooves 40c and 40d are spaced radially outwardly from the inner radial surface of the housing 40 a predetermined amount to form cantilevered portions 40e and 40f that extend radially inwardly from the respective grooves. The thickness of each cantilevered portion 40e and 40f is such that it functions as a mechanical spring. It is understood that the thickness of each cantilevered portion 40e and 40f, and therefore the stiffness of the mechanical spring formed by each portion, can be adjusted relative to the bearing stiffness of the tilt pads 38.

A majority of the radial inner surface of the housing 40, including the cantilevered portions 40e and 40f, is radially spaced from the radial outer surface of the cage 36 to form an annular clearance C which communicates with the recess 40a of the housing 40 and thus receives some of the above-mentioned oil.

Figure 4:
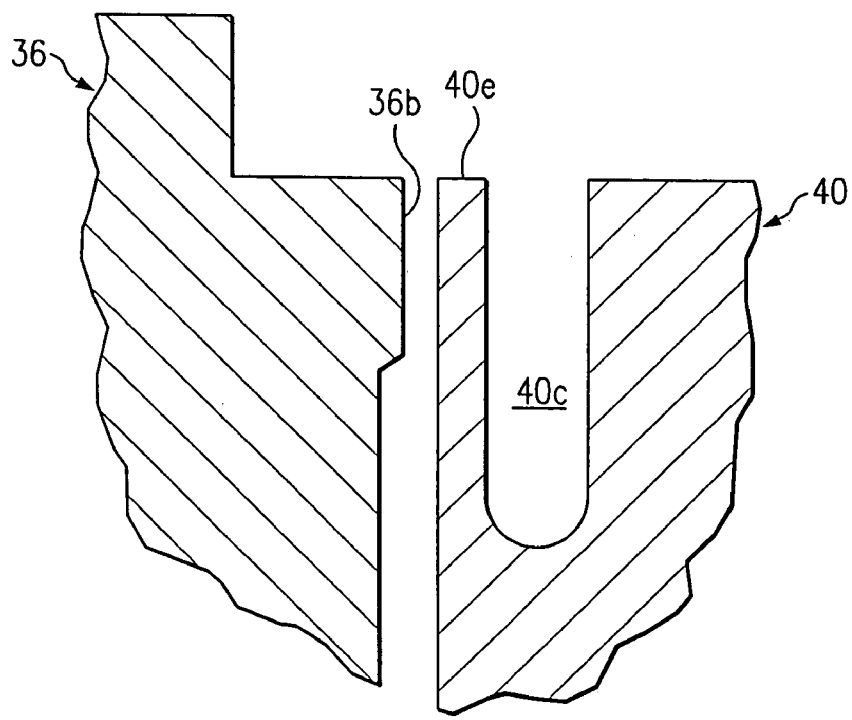

As better shown in FIG. 4, an axial end portion 36b of the radial outer surface of the cage 36 is enlarged so as to project radially outwardly from the plane of the latter portion. Although FIG. 3 depicts the end portion 36b slightly spaced from the corresponding inner surfaces of the housing 40 in the interest of clarity, it actually engages the latter surfaces in an interference fit to prevent the leakage of oil from the clearance C. Also, the axial length of the enlarged end portion 36b is designed to minimize contact stresses between the cage 36 and the housing 40.

Thus, the embodiment of FIGS. 3 and 4 enjoys all the advantages of the embodiment of FIGS. 1 and 2 set forth above.

Figure 5:
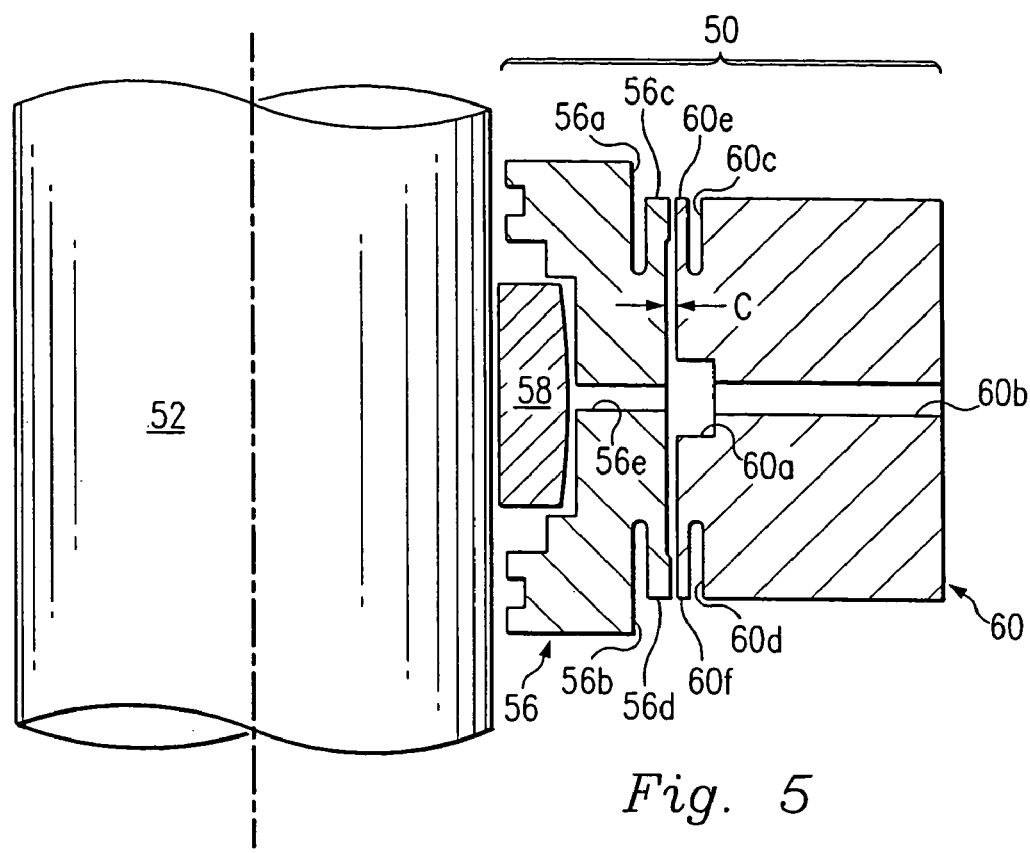
FIGS. 5 and 6 are views, similar to FIGS. 1 and 2, respectively, but depicting another alternate embodiment of the present invention.
Figure 6:
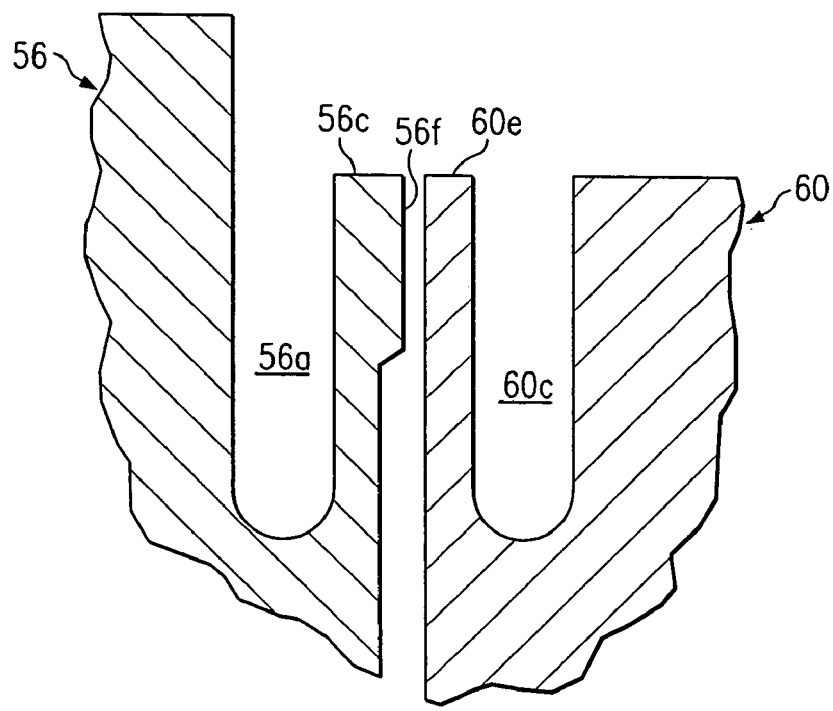

A bearing assembly according to another embodiment of the invention is shown, in general by the reference numeral 50 in FIGS. 5 and 6. As shown in FIG. 5, the bearing assembly 50 surrounds a rotor 52 which is rotated about its axis and forms part of an assembly that includes a driving system for imparting torque to the rotor, in a conventional manner.

An annular bearing cage 56 extends around the rotor 52 and has an internal recess formed therein for receiving a series of tilt pads 58, one of which is shown, which form the bearing members. Since the tilt pads 58 are conventional, they will not be described in detail.

Two axially-extending grooves 56a and 56b are formed in the outer periphery of the cage 56 with each extending for approximately 180 degrees. The grooves 56a and 56b are spaced radially inwardly from the outer radial surface of the cage 56 a predetermined amount to form cantilevered portions 56c and 56d that extend radially outwardly from the respective grooves. The thickness of each cantilevered portion 56c and 56d is such that it functions as a mechanical spring. The thickness of each cage portion 56c and 56d, and therefore the stiffness of the mechanical spring formed by each portion, can be adjusted relative to the bearing stiffness of the tilt pads 58.

A radially-extending passage 56e is formed through the center of the cage 56 for supplying lubricating oil to the tilt pad 58, in a manner to be explained.

An annular housing 60 surrounds the cage 56 and has an internal annular recess 60a which communicates with the passage 56e of the cage 56 and with a radially-extending through passage 60b. Oil can thus be introduced to the passage 60b and passes through the latter passage, the recess 60a, and the passage 56e for supplying oil to the tilt pads 58.

A majority of the radial inner surface of the housing 60 is slightly spaced from the radial outer surface of the cage 56, including the cantilevered portions 56c and 56d, to form an annular clearance C which communicates with the recess 60a of the housing 60 and thus receives some of the above-mentioned oil.

As better shown in FIG. 6, the axial end portion of the radial outer surface of each cantilevered portions 56c and 56d is enlarged as shown by the reference numeral 56f in connection with the cage portion 56c. The enlarged portions, including the portion 56f, project radially outwardly from the plane of the latter portions and engages the corresponding inner surfaces of the housing 60 in an interference fit. Although the enlarged portions, including the portion 56f, are shown slightly spaced from the corresponding inner surfaces of the housing 60 in FIGS. 5 and 6 in the interest of clarity, they actually engage the latter surfaces in an interference fit to prevent the leakage of oil from the clearance C. Also, the axial lengths of the enlarged portions, including the portion 56f, are designed to minimize contact stresses between the cage 56 and the housing 60.

Two axially-extending grooves 60c and 60d are formed in the outer periphery of the housing 60 and each extends for approximately 180 degrees. The grooves 60c and 60d are spaced radially outwardly from the inner radial surface of the housing 60 a predetermined amount to form cantilevered portions 60e and 60f that extend radially inwardly from the respective grooves. The thickness of each cantilevered portion 60e and 60f is such that it functions as a mechanical spring. The thickness of each cantilevered portion 60e and 60f, and therefore the stiffness of the mechanical spring formed by each portion, can be adjusted relative to the bearing stiffness of the tilt pads 58.

Thus, the embodiment of FIGS. 5 and 6 enjoys all the advantages of the embodiment of FIGS. 1 and 2, and the embodiment of FIGS. 3 and 4.

It is understood that variations may be made in each of the above embodiments without departing from the scope of the invention. For example, the number of angularly-spaced grooves formed in the cage and the housing in each of the above embodiments can vary and, in fact, there can be only one groove that is continuous in an angular direction. Also, the radial and axial lengths of the cage portions, including the enlarged portions, can vary from those shown in the drawings. Also, the sealing between the housings and their respective cages can be done by other means than metal-to-metal contact as shown on the drawings. Further, the cages and/or the housings can be formed by two split arcuate sections that are attached at their respective ends, in a conventional manner.

Since other modifications, changes, and substitutions are intended in the foregoing disclosure, it is appropriate that the appended claims be construed broadly and in a manner consistent with the scope of the invention.

What is claimed is:

1. A bearing assembly for a rotor, the assembly comprising:
   a cage member surrounding the rotor;
   a housing member surrounding the cage member; and
   at least one axially-extending groove formed in the housing member to form a cantilevered portion extending between the groove and the corresponding surface of the cage member.

2. The bearing assembly of claim 1 further comprising at least one tilt pad disposed in a recess in the cage member and adapted to engage the rotor.

3. The bearing assembly of claim 1 wherein a clearance is formed between at least a portion of the radial outer surface of the cage member and the corresponding portion of the inner surface of the housing member; and wherein a passage extends through the housing member and registers with the clearance for passing oil to the clearance.

4. The assembly of claim 3 further comprising:
a recess formed in the radial inner surface of the cage member;
a passage extending through the cage member and from the clearance to the recess for receiving the oil from the clearance and passing it to the recess; and
at least one tilt pad disposed in the recess for receiving the oil and adapted to engage the rotor.

5. The assembly of claim 3 wherein a first portion of the radial outer surface of the cage member extends in a slightly spaced relation to the corresponding portion of the inner surface of the housing member to form the clearance, and a second portion of the radial outer surface of the cage member projects from the first portion in a radial direction and engages the corresponding portion of the inner surface of the housing member to prevent oil leakage from the clearance.

6. The assembly of claim 1 wherein the cage member and the housing member are annular.

7. The assembly of claim 1 wherein the cantilevered portion forms a mechanical spring.

8. The bearing assembly of claim 1 further comprising:
at least one axially-extending groove formed in the cage member to form a cantilevered portion extending between the groove and the corresponding surface of the housing member.

9. The bearing assembly of claim 8 wherein the cantilevered portion of the cage member extends between the groove of the cage member and the corresponding cantilevered portion of the housing member; and wherein the cantilevered portion of the housing member extends between the groove of the housing member and the corresponding cantilevered portion of the cage member.

10. The bearing assembly of claim 8 further comprising at least one tilt pad disposed in a recess in the cage member and adapted to engage the rotor.

11. The bearing assembly of claim 8 wherein a clearance is formed between at least a portion of the radial outer surface of the cage member and the corresponding portion of the inner surface of the housing member; and wherein a passage extends through the housing member and registers with the clearance for passing oil to the clearance.

12. The assembly of claim 11 further comprising:
a recess formed in the radial inner surface of the cage member;
a passage extending through the cage member and from the clearance to the recess for receiving the oil from the clearance and passing it to the recess; and
at least one tilt pad disposed in the recess for receiving the oil and adapted to engage the rotor.

13. The assembly of claim 11 wherein a first portion of the radial outer surface of the cage member extends in a slightly spaced relation to the corresponding portion of the inner surface of the housing member to form the clearance, and a second portion of the radial outer surface of the cage member projects from the first portion in a radial direction and engages the corresponding portion of the inner surface of the housing member to prevent oil leakage from the clearance.

14. The assembly of claim 8 wherein the cage member and the housing member are annular.

15. The assembly of claim 8 wherein each cantilevered portion forms a mechanical spring.

\* \* \* \* \*